Aug. 5, 1958    V. J. READ    2,846,639
AUTOMATIC CUT-OUTS FOR DYNAMO-BATTERY SYSTEMS
Filed June 24, 1957
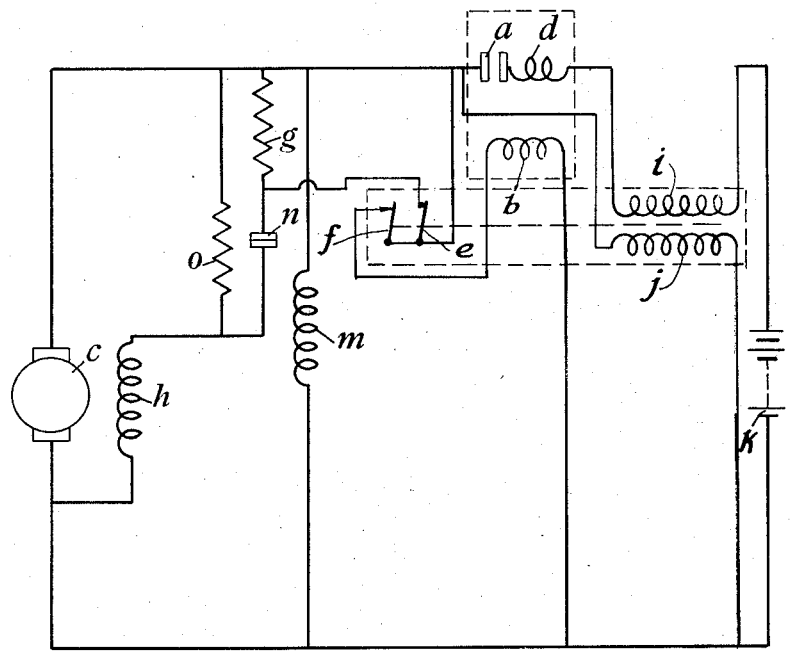
Inventor
V. J. Read 2,846,639

AUTOMATIC CUT-OUTS FOR DYNAMO-BATTERY SYSTEMS

Victor John Read, East Dulwich, London, England, assignor to C. A. V. Limited, London, England Application June 24, 1957, Serial No. 667,340

Claims priority, application Great Britain July 2, 1956

1 Claim. (Cl. 322—25)

This invention relates to the automatic cutouts of the kind used on dynamo-battery systems as employed, for example, on road vehicles, and in which a battery is charged from a variable speed dynamo, the field system of the dynamo being controlled by an electromagnetically operated voltage regulator.

The object of the invention is to provide a cut-out in an improved form which reliably ensures prompt opening of the cut-out when, with falling dynamo-speed, current flows from the battery to the dynamo.

A cut-out in accordance with the invention comprises an electromagnet responsive to the dynamo voltage for closing the cut-out contacts, a dual switch having parts which when closed respectively short-circuit a resistance in the field winding circuit of the dynamo, and close the circuit containing the winding of the said electromagnet, and a second electromagnet comprising opposed current and voltage windings for opening the dual switch when current flows from the battery to the dynamo.

Further objects and advantages will be apparent from the following description taken in connection with the accompanying drawing, in which the single figure presented is a diagrammatic showing of one form of the invention.

In the example, as illustrated by the drawing, the cut-out comprises a pair of contacts $a$ one of which is fixed, and the other of which is carried by an armature forming part of an electromagnet, the winding $b$ of this electromagnet being a voltage winding which when the cut-out is installed in a dynamo battery system is connected in parallel with the dynamo $c$. The electromagnet of the cut-out may also include a series winding $d$ which supplements the action of the winding $b$ when the cut-out is closed. To the dynamo side of the cut-out is connected a normally closed dual switch comprising a pair of switches $e$ $f$. When closed the switch $e$ serves to short circuit a resistance $g$ in series with the field winding $h$ of the dynamo. The other switch $f$ closes the circuit containing the electromagnet winding $b$.

For actuating the dual switch a second electromagnet is provided. This comprises a current winding $i$ connected in series with the battery side of the cut-out, and a voltage winding $j$ connected in parallel with the dynamo side of the cut-out. These windings are opposed so that when current is being supplied from the dynamo $c$ to the battery $k$ the associated electromagnet is inoperative.

The dynamo regulator is of conventional form, and comprises an electromagnet having a winding $m$ responsive to the dynamo voltage, for actuating switch contacts $n$ which control the regulator resistance $o$ the said contacts being in series with the resistance $g$.

The arrangement is such that when the dynamo voltage reaches a pre-determined amount, the cut-out contacts $a$ are closed by the first mentioned electromagnet for connecting the dynamo to the battery. So long as current flows to the battery the second electromagnet is ineffective. But when due to drop of speed the dynamo voltage falls below that of the battery, and current can then flow from the battery to the dynamo, the second electromagnet becomes operative, and causes both parts of the dual switch $e$ $f$ to open. The effect of this is to interrupt the circuit containing the winding $b$ of the first electromagnet, so causing the cut-out to open promptly. Also the resistance $g$ is brought into action, so causing a sudden further drop of the dynamo voltage sufficient to put the second electromagnet out of action. Thereupon the dual switch recloses and restores the condition in which the cut-out can again become operative when the dynamo generates an adequate voltage.

Having thus described my invention what I claim as new and desire to secure by Letters Patent is:

An automatic cut-out of the kind specified for a dynamo-battery system, comprising an electromagnet responsive to the dynamo voltage for closing the cut-out contacts, a dual switch having parts which when closed respectively short-circuit a resistance in the field winding circuit of the dynamo, and close the circuit containing the winding of the said electromagnet, and a second electromagnet comprising opposed current and voltage windings for opening the dual switch when current flows from the battery to the dynamo.

No references cited.